Reissued Feb. 11, 1930 Re. 17,593

UNITED STATES PATENT OFFICE

FRANCIS GURNEY OKIE, OF ST. PAUL, MINNESOTA, ASSIGNOR TO MINNESOTA MINING AND MANUFACTURING COMPANY, OF ST. PAUL, MINNESOTA, A CORPORATION OF MINNESOTA

ABRASIVE ARTICLE

No Drawing. Original application filed March 4, 1922, Serial No. 541,248. Divided and application filed December 29, 1923, Serial No. 683,522. Original No. 1,581,657, dated April 20, 1926. Application for reissue filed April 19, 1928. Serial No. 271,396.

My present invention relates in general to the treatment of material, preferably in sheet form, and more particularly the treatment of material for the purpose of forming or attaining composite structures, of which well known forms of abrasives, such as what is commonly known as sand-paper, is an example. The present application is, in part, a continuation of my copending application, Serial No. 428,289, filed Dec. 4, 1920, and a division of my application, Serial No. 541,248 filed Mar. 4, 1922, and associated with my applications, Serial Nos. 428,287 filed Dec. 24, 1920 and 670,542 filed Oct. 24, 1923.

Although I hereinafter disclose the practice of my invention in connection with abrasives such as sand-paper it will be understood that my invention, or certain features thereof, have a wider field of utility.

Composite structures of the abrasive type such as sand-paper or emery cloth comprise generally (*a*) a base of sheet material, which may be felted as in the case of paper or woven as in the case of cloth, (*b*) a more or less finely comminuted resistant material having abrading properties, such as garnet or corundum, and (*c*) a binder generally in the form of a glue which serves to bind the abrasive to the base.

The abrasive products as produced at present have as incidents certain features among which are affinity for moisture rendering them substantially inutile in the presence of water or moisture, and cracking, with consequent exposure of the base, when bent.

The principal objects of my present invention are the provision of a binder which functions more efficiently than any known to me; the provision of an abrasive article having a binder characterized by flexibility without cracking or other undesirable effects; the provision of such an article characterized by extensibility and compressibility to accommodate itself to flexion of the base; the provision of such an article having a binder by means of which the desired adhesive action between it and the base is attained not only efficiently but also with a desirable degree of acceleration, and more particularly the provision of such an article having a binder in which the drying action will be effective from the contact surface between it and the base outwardly; the provision of such an article having a binder in which the drying action will be effective from the outer surface inwardly; the provision therein of a binder characterized by a drying action that permits of handling the product with a minimum of delay and more particularly such handling without impairment of the superficies of the material; the provision therein of a binder characterized by an accelerated drying action; the provision therein of a binder characterized by a limitation of its drying action; the provision of an improved moisture-proof material and especially material in a sheet form, and more particularly one having means for causing a moisture-proofing agent to penetrate into the material; the provision of a moisture-proof composite abrasive structure; the provision of a binder having moisture-proofing functions, and the provision generally of an improved composite abrasive structure and of a method of producing the same, together with such other objects and additional benefits and advantages as may hereinafter appear or be pointed out.

In the employment of my present invention for the production of sand-paper and the like, suitable for employment in a water abrading operation (which I cite for purposes of example) I use as the base a sheet of material (which may be paper) as will conveniently serve the employement contemplated, and as the abrasive such comminuted material (which may be crushed garnet) similarly adapted to serve the function in view.

It is desirable that the binder utilized have the functions and characteristics not only of great mechanical strength and of great binding strength, but also that it be non-hygroscopic, permeative, moisture resistant, easily worked, readily obtainable, inexpensive and facilely applied.

I have discovered that gums of such types as rosin are peculiarly adapted for the attainment of these ends, and ordinary turpentine rosin is preferred by me as best attaining the desired end, viewed from certain aspects. Other gums and resins, natural or synthetic, having the desired characteristics may also be utilized.

In preparing the binder for use, the gum is used in connection with a suitable vehicle which I prefer is of a type such as linseed oil, China-wood oil, otherwise known as tung oil, perilla oil or fish oil, or even a semi-drying oil such as soya-bean oil, for reasons which I will proceed to explain.

In applying a gum prepared with a vehicle such as China-wood oil to one surface of a base of paper, for example I have found that the action of the vehicle involves a penetration of the base by the vehicle, for example, China-wood oil or any similar drying oil or semi-drying oil.

This results in a moisture-proofing of the material even against the absorption of moisture through the surface opposite to that to which the binder is applied, without at the same time defacing or otherwise undesirably affecting such opposite surface.

The penetration by the vehicle, particularly when coupled with the use of the character of gum pointed out above, carries with it in such penetration a certain amount of finely divided gum so that a coating and binding action is secured between the fibres of elemental portions of the base which thus substantially retards, if it does not entirely prevent, disintegration of the material of the base, in addition to preventing access of moisture through the base to the plane of contact between the base and the main mass of the binder material.

The efficient action of the binder may be enhanced in the manufacture of sand-paper if the binder is applied to the base by the use of pressure, and the more or less finely divided abrasive is then applied in such a manner as to cause it to adhere to the binder.

In order to accelerate the adhesion between the binder and the base, I have discovered it desirable to use with the binder a modifying agent the action of which is to cause a desiccation of the binder initiated at the contact surface of the binder with the base and effective outwardly.

In my experience I have discovered that there are a number of materials having a metallic base which are useful for my present purposes, that manganic oxides are peculiarly useful and that borate of manganese best combinates siccative energy with the desirable susceptibility to fine grinding.

Due to the relatively slow drying of binders generally, difficulties are encountered in handling the structure, within a convenient period because of the soft and sticky character particularly of the exposed surfaces of the binder. This objection I mitigate by associating with the improved binder a substance the action of which is to produce an accelerated drying action effective primarily at the exposed surface and working inwardly, and for this purpose I incorporate in the binder a modifying element peculiarly effective in its action as an oxidizing agent on such vehicles as linseed, China-wood or tung oil and as a retarding agent with reference to the excess absorption of the vehicle by the base.

The substance I have discovered to be particularly adapted for this purpose is that well-known to the trade obtainable in the open market and formed by a new electrolytic process white lead and which in my experience is found to be more satisfactory than any other known form of carbonate of lead.

Whereas by itself the white lead adds but relatively little strength to the binder, in association in the binder with the borate of manganese it intensifies the action of the binder in holding the abrasive firmly against the base.

For intensifying the binding action of the binder and for intensifying the drying action of the dryers, and at the same time accomplishing such ends by the employment of a material which is efficacious in holding the mineral elements in suspension without loss of siccative energy or reducing the relative fluidity of the material, I have discovered that it is advantageous to employ as part of the binder a paste dryer. This may comprise such mineral substances as sugar of lead and borate of manganese suspended in a resinous vehicle but I find it preferable to form the paste dryer so as to have the minerals contained therein in the form of acetate of lead and resinate of manganese. I have found by experience that the paste dryer should be somewhat in the nature of cheesy butter, rather softer, and of a light brownish grey color.

As an auxiliary in (1) accentuating the adhesion of the binder to the paper, (2) facilitating to a certain extent the spreading of the binder, and (3) modifying as desired the consistency of the binder as is useful in cases where it is desired to render it more fluid, I have discovered that the use of a japan dryer is desirable. Such a dryer as that which is relatively free from resin is convenient. One form of this contains shellac, red lead, litharge, manganese oxid, burnt umber, gum, linseed oil and turpentine q. s.

In order to give the binder the desired body volumetrically considered, I preferably employ a varnish consisting largely of China-wood oil, linseed oil, perilla oil, or fish oil, boiled until it approaches a solid state. As far as feasible this should be as free as possible from glycerides and fatty acids.

Though I have hereinabove disclosed certain forms of useful dryers having various characteristics, and likewise intensifiers, I have discovered that where it is advisable that the siccative action thereof be limited, or at least retarded, under certain conditions, or when producing material for certain purposes, that it is desirable to incorporate in the binder a non-drying oil such as castor oil or the like, for such purposes.

Sand-paper made in accordance with the disclosure of my present invention is characterized by great flexibility without any adverse effects, such as cracking of the binder or base, or loosening of one from the other.

The materials used by me as hereinabove described may be varied in character so as to vary the characteristics of the binder from the standpoint of adhesiveness, non-hygroscopy, and flexibility. Where such variation in the use of materials is employed to produce, for instance, increased adhesion between the binder and the abrasive, such increase may be attained though possibly at a certain expense in its characteristic of flexibility. Due, however, to this very same increased adhesiveness, one or more of the outer layers of the base may be removed as by the employment of a base which involves the use of a built up structure having a number of plies, certain of which may be removed, or by shaving off part of the thickness of the base, or by splitting an ordinary sheet of paper. This is made possible in the case of my improved binder since I am able to regulate the degree of its penetration of the paper, as desired, and so, after soaking, I am able to split an ordinary sheet.

By this process I am enabled to obtain sand paper characterized by extraordinary thinness and flexibility, in that I am able to form sand-paper and the like with a base so thin that such product could not be manufactured if the base originally used were of the thinness ultimately desired.

In my preferred practice with China-wood oil and rosin, the adhesive applied is of approximately the following proportions by weight and percentages:

| | | Per cent |
|---|---|---|
| China-wood oil (tung oil) | 106 lbs. | 53 |
| Hardened rosin | 24 lbs. | 12 |
| Linseed oil | 20 lbs. | 10 |
| Dryer | 2 lbs. | 1 |
| Thinner | say 48 lbs. | 24 |

One of the virtues of a waterproof binder of the present composition is that it not only penetrates the supporting base, rendering it waterproof, but also is of great utility as contrasted with organic glue (prepared from gelatinous matter) inasmuch as it may be used with oiled or waxed paper which has been waterproofed by treatment with so-called non-drying oil, such as castor oil, semi-drying oil, such as soya-beam oil, or even drying oil, such as linseed oil, or China-wood oil, or fish oil, waxy compounds, such as paraffin, beeswax, carnauba wax, etc., to which a glue bond will not adhere, but to which my improved binder readily adheres by virtue of its powers of permeation of the base and of commingling with such oiling, greasing or wax agents. In practice I not only find it at times convenient to heat the binder to facilitate its application to the back, but also to increase its powers of penetration of the base, though in some cases it may be used cold.

After the adhesive and abrasive materials are applied, the paper is suitably forced dried (or partially "baked" as it is said), to the desired extent by subjecting it in the usual manner to a temperature which I prefer to control between 130° F. and 150° F., depending upon the degree of hardness desired, an average of say 140° F. being in my opinion the optimum, a suitable degree of humidity being maintained, in the drying chamber to prevent the paper from becoming too crisp or brittle.

The binder of my present invention is noteworthy in that it not only penetrates the paper etc. of the backing or base, but penetrates, mixes with, or combines with various oils, greases and waxes that are commonly used as water-proofing agents for fabric, and this without weakening, breaking down, or other deleterious mechanical or chemical effects.

In cases where the surface of the fabric is not suitable for the application of a smooth coating of the binder I have found it convenient to apply a filler to the base to facilitate such application. This may consist of any one of the known fillers having a clayey, silicon, or like base.

In cases where it is desirable or necessary to employ a sizing coat, that is, an auxiliary or additional coat or one of a plurality of finishing coats, I find that a thinned composition similar to that disclosed herein as forming the binder itself, is satisfactory. As an example of the sizing coat, which also may be employed as a moisture-proof backing, I submit the following formula by weight:

(*A*)

| | |
|---|---|
| Treated rosin or resin | 2700 |
| China-wood oil | 13962 |
| Mineral dryers | 79 |
| Thinners | 12611 |
| | 29352 |

An alternative formula for the same purpose may include the following ingredients by weight:

(*B*)

| | |
|---|---|
| Treated rosin or resin | 2700 |
| China-wood oil | 8100 |
| Mineral dryers | 83 |
| Thinners | 8850 |
| Linseed oil | 2125 |

Any one of the formulæ above set forth may be employed depending upon the results desired or the conditions under which the sizing coat is to be applied. The sizing coat, depending upon the result desired, may be applied under various conditions of the binding coat or abrasive carrying layer and at various times, for instance, I have applied the sizing coat herein designated "A" shortly after the abrasive and binder have been applied or as late as a week to two weeks thereafter. It will be understood that, whether the sizing coat is applied shortly after the abrasive and binder or after the elapse of a considerable time interval and upon whether the sizing coat contains suitable solvents for the binder, depends the degree of penetration, if any, of the material of the sizing coat into the binder carrying the abrasive. For example, if the sizing coat is applied substantially immediately after a preliminary setting of the abrasive carrying binder has taken place, there will result a penetration of the abrasive carrying binder by the sizing coat, or a homogenizing of the binder coat and the sizing coat, but regardless of the length of time of set of the binder, when the sizing coat is applied it adheres very tenaciously to the binder.

Alternately, if a considerable time interval is permitted to elapse between the preliminary setting of the binder and the application of the sizing coat, and sufficient suitable solvents are included in the sizing coat composition a partial solving of the binder will result, and thus bring about homogenization to a degree of the material of the binder and the sizing coat.

As an example of one of my practices, I apply the binder or adhesive coat and substantially immediately thereafter I apply the abrasive. About an hour after the adhesive coat and abrasive material are applied the sheet enters the drying room and remains there for approximately forty-eight hours preferably in a temperature varying from 100 to 150 degrees F., partially cooling during the night when the heat supply is reduced or shut off. The paper or cloth abrasive sheet is then removed from the drying room and if it is convenient to apply the sizing coat this is done so immediately. If not convenient to size at that time the abrasive sheets are left on the rolls until it is so convenient to apply the sizing coat. The time which the abrasive sheet is left on the roll is, generally speaking, immaterial, though I may apply the sizing coat at a particular phase of the hardening of the abrasive carrying binder in order to enhance adhesiveness. Consequently, the sizing coat may be applied at a convenient time, which may be as long as a week or two after the adhesive and abrasive have been applied, or at other times, depending on circumstances.

When the sizing is to be applied, the sheet is unrolled from the rack on which it is supported, and a moisture-proofing layer is applied to the back of the sheet, if desired, as for example, if the paper has not previously been water-proofed. This backing layer may be of the same composition as that of the sizing layer applied to the abrasive. The sizing for the abrasive side is then carried out, or may be done substantially simultaneously with the application of the backing sizing. After the sizing or sizings have been applied the sheet is preferably again subjected to heat, if desired, as is found expedient for some purposes and under some conditions.

Satisfactory results are obtained during the forty-eight hours drying or setting by applying about 100 to 150 degrees F. for 10 hours of each of the two days, so that a total of approximately twenty hours of heat is applied, where artificial heating is desired.

The degree of penetration of the adhesive by the sizing coat or whether there is any actual penetration, may not always be a vital factor in the production of a satisfactory moisture-proof abrasive sheet, because as I have pointed out above, the sizing adheres quite tenaciously to the binder and abrasive, and while penetration and consequent homogenization of the binder with the sizing coat gives a more intimate joint, a purely surface junction between the binder and the sizing coat is all that is essential to the production of a satisfatcory article, for some purposes, if the sizing coat is employed.

With further reference to the junction obtained between the adhesive and the sizing coat, I might explain that as the sizing coat is warm when applied to the abrasive and binder, there is produced a softening of the binder, which may result in penetration, depending upon the factors pointed out.

The following formulæ by weight comprise additional materials which I find suitable for my purposes, and result each in the production of a highly moisture-proof, flexible and tenacious binder and sizing coat for abrasive devices:

*C-binder*

| | |
|---|---|
| Treated rosin or resin | 2700 |
| Linseed oil | 1044 |
| China-wood oil | 7584 |
| Mineral dryers | 135 |
| Thinners | 2040 |

*C-sizing usually employed with C-binder*

| | |
|---|---|
| Treated rosin or resin | 2700 |
| Linseed oil | 1044 |
| China-wood oil | 7584 |
| Mineral dryers | 135 |
| Thinners | 22255 |

It will be observed that the formula designated C-sizing is similar in all respects to the composition of the C-binder with the exception that an increased proportion of thinner is employed.

The following formulæ by weight have also been tried but I have obtained markedly less satisfactory results with their use, and not only do not consider them practicable but quite inferior:

*D-binder*

| | |
|---|---|
| Venetian red or white lead | 900 |
| Dissolved rubber | 900 |
| Venice turpentine | 900 |
| Treated rosin or resin (proportions—shellac 900, copal 1800) | 2700 |
| Linseed oil | 4716 |
| Mineral dryers | 90 |

*D-sizing coat usually employed with D-binder*

| | |
|---|---|
| Venetian red or white lead | 900 |
| Dissolved rubber | 900 |
| Venice turpentine | 900 |
| Treated rosin or resin (proportions—shellac 900, copal 1800) | 2700 |
| Thinners | 2000 |
| Linseed oil | 4716 |
| Mineral dryers | 90 |

An alternative form of binder similar to that designated D-binder is as follows:

*E-binder*

| | |
|---|---|
| Venetian red or white lead | 1350 |
| Venice turpentine | 900 |
| Treated rosin (copal) | 2700 |
| Linseed oil | 6407 |
| Mineral dryers | 135 |

*E-sizing usually employed with E-binder*

| | |
|---|---|
| Venetian red or white lead | 1350 |
| Venice turpentine | 900 |
| Copal | 2700 |
| Thinners | 2000 |
| Linseed oil | 6407 |
| Mineral dryers | 135 |

It will be observed here, as in the case of the C and D binders, that the sizing coat is of substantially the same materials as that of the binder or abrasive carrying coating, with the exception that thinners are added, or if already present, increased sufficiently to permit the top sizing coat to flow readily between the grains of abrasive and amalgamate with the binder or adhesive coat.

Within my experience, all formulæ containing both rubber and oil are open to grave objections, in that these two substances are antipathetic, and under the action of the oil, any abrasive containing rubber known to me tends to premature disintegration.

I have also employed as a sizing coat both natural and so-called imitation or synthetic shellac cut in alcohol, and, alternately melted or otherwise made fluid with oil and gum compositions, or so-called treated cellulose (cellulose nitrate, cellulose acetate, cellulose contagenate), or synthetic resins such as condensation products of which the so-called bakelite is a type.

Having thus described my invention and illustrated its use, what I claim as new and desire to secure by Letters Patent is:

1. The new article of manufacture in the nature of sandpaper comprising a flexible sheet of fabric, a grit or layer of abrasive particles, a waterproof stable penetrative adhesive bond interposed between said grit and said sheet, and a compensatory auxiliary bonding coat applied to the article, said bond and auxiliary coat being of a nature to maintain the bonding effect throughout the effective abrading life of the abrasive article when employed in a water abrading operation and not deleteriously affecting the flexibility of said sheet when dry.

2. The new article of manufacture in the nature of sandpaper comprising a flexible sheet of fabric, a grit or layer of abrasive particles, a waterproof stable adhesive bond interposed between said grit and said sheet, and an auxiliary coat applied to the article, said bond and auxiliary coat cooperating to prevent disintegration of the sheet when used in a water abrading operation, and being of a nature to maintain the bonding effect throughout the effective abrading life of the abrasive article when employed in a water abrading operation and not deleteriously affecting the flexibility of said sheet when dry.

3. The new article of manufacture in the nature of sandpaper comprising a flexible sheet of fabric, a grit or layer of abrasive particles, a waterproof stable adhesive bond interposed between said grit and said sheet, and an auxiliary coat applied to the article, said auxiliary coat being of a character to unite with said bond, and said bond and auxiliary coat being of a nature to maintain the bonding throughout the effective abrading life of the abrasive article when employed in a water abrading operation and not deleteriously affecting the flexibility of said sheet when dry.

4. The new article of manufacture in the nature of sandpaper comprising a flexible sheet of fabric, a grit or layer of abrasive particles, a waterproof stable adhesive bond interposed between said grit and said sheet, and an auxiliary coat applied to the article, said auxiliary coat being of a character to act as a solvent of and coalesce with said bond, and said bond and auxiliary coat being of a nature to maintain the bonding effect throughout the effective abrading life of the abrasive article when employed in a water abrading operation and not deleteriously affecting the flexibility of said sheet when dry.

5. The new article of manufacture in the nature of sandpaper comprising a flexible sheet of paper or material similarly susceptible to fluid penetration, a grit or layer of abrasive particles, a waterproof stable adhesive bond interposed between said grit and said sheet, said bond penetrating said sheet to protect it against water, an auxiliary coat of analogous character applied to the article and penetrating said bond, said auxiliary coat cooperating with said bond and the two being of a nature to maintain the bonding effect throughout the effective abrading life and prevent disintegration of the abrasive article when employed in a water abrading operation.

6. The new article of manufacture in the nature of sandpaper comprising a flexible sheet of paper or material similarly susceptible to fluid penetration, a grit or layer of abrasive particles, a waterproof stable adhesive bond in the nature of a varnish, interposed between said grit and said sheet, said bond penetrating said sheet to protect it against water, an auxiliary coat of the nature of a less viscous varnish, applied to the article and penetrating said bond, said auxiliary coat and bond being of a nature to maintain the bonding effect throughout the effective abrading life of the abrasive article when employed in water abrading operation.

7. The article of manufacture in the nature of sandpaper, comprising a flexible sheet of fabric, a grit or layer of abrasive particles, and a plurality of coats of waterproof material applied to said article, one of said coats serving as a stable waterproof adhesive bond interposed between said grit and said sheet and of a nature to maintain the bonding effect throughout the effective abrading life of the abrasive article when used in a water abrading operation, and another of said coats serving as an auxiliary waterproofing agent which coacts with the adhesive bond to prevent disintegration of the article when used in such water abrading operation, and said coat not deleteriously affecting the flexibility of the article when dry.

8. The new article of manufacture in the nature of sandpaper, comprising a flexible sheet of fabric, a grit or layer of abrasive particles, and a plurality of coats of waterproof material applied to said article, one of said coats being applied to one surface of the sheet and serving as a stable waterproof adhesive bond interposed between said grit and said sheet and of a nature to maintain the bonding effect throughout the effective abrading life of the abrasive article when used in a water abrading operation, and another of said coats being applied to the opposite surface of the sheet and serving as an auxiliary agent which coacts with the adhesive bond to prevent disintegration of the article when used in such water abrading operation, and said coats not deleteriously affecting the flexibility of the article when dry.

9. The new article of manufacture in the nature of sandpaper, comprising a flexible sheet of waterproof fabric, a grit or layer of abrasive particles, and a waterproof stable adhesive bond interposed between said grit and said sheet of a nature to maintain the bonding effect throughout the effective abrading life of the abrasive articles when used in a water abrading operation and not deleteriously affecting the flexibility of said sheet when dry.

10. The new article of manufacture in the nature of sandpaper, comprising a flexible sheet of waterproof fabric, a grit or layer of abrasive particles, and a waterproof stable adhesive bond interposed between said grit and said sheet and an auxiliary coat applied to the article, said bond and auxiliary coat cooperating to prevent disintegration of the article and being of a nature to maintain the bonding effect throughout the effective abrading life of the abrasive article when used in a water abrading operation and not deleteriously affecting the flexibility of said sheet when dry.

11. The new article of manufacture in the nature of sandpaper, comprising a flexible sheet of fabric, one surface of which is treated to prevent disintegration when used in a water abrading operation, a grit or layer of abrasive particles, and a waterproof stable adhesive bond interposed between said grit and the opposite surface of said sheet of a nature to maintain the bonding effect throughout the effective abrading life of the abrasive article when used in a water abrading operation and not deleteriously affecting the flexibility of said sheet when dry.

12. The new article of manufacture in the nature of sandpaper, comprising a flexible sheet of fabric one surface of which is treated to prevent disintegration when used in a water abrading operation, a grit or layer of abrasive particles, and a waterproof stable adhesive bond interposed between said grit and the opposite surface of said sheet and an auxiliary coat applied to the article, said bond and auxiliary coat being of a nature to maintain the bonding effect throughout the effective abrading life of the abrasive article when used in a water abrading operation and not deleteriously affecting the flexibility of said sheet when dry.

13. The new article of manufacture in the nature of sandpaper, comprising a flexible sheet of fabric, a grit or layer of abrasive particles, and a plurality of coats of waterproofing material applied to said article, one of said coats serving as a primary stable waterproof adhesive bond interposed between said grit and said sheet and of a nature to maintain the bonding effect throughout the effective abrading life of the abrasive article, and another of said coats applied thereover serving as a secondary bond, and a third coat applied to the opposite surface serving as an auxiliary agent for preventing disintegration of the article and starving of the bond, said several coats not deleteriously affecting the flexibility of the article when dry.

14. The process of making a stable waterproof abrasive article in the nature of sandpaper or the like which includes applying to a flexible sheet of fabric a grit or layer of abrasive particles, and a plurality of coats of waterproof material, by interposing as one of said coats a stable waterproof penetrative adhesive bond between said grit and said sheet the said adhesive bond being of a nature to maintain the bonding effect throughout the effective abrading life of the abrasive article, allowing said adhesive bond to penetrate the sheet, and compensating for penetration of said sheet by the bond by applying another of said coats as an auxiliary bonding and waterproofing agent, and said coats not deleteriously affecting the flexibility of the article when dry.

15. The process of making a stable waterproof abrasive article in the nature of sandpaper or the like which includes applying to a flexible sheet of fabric a grit or layer of abrasive particles, and a plurality of coats of waterproof material, interposing one of said coats as a stable waterproof adhesive bond between said grit and one surface of said sheet the said adhesive bond being of a nature to maintain the bonding effect throughout the effective abrading life of the abrasive article, and applying another of said coats to the opposite surface of the sheet to serve as an auxiliary agent, and allowing said latter coat to engage the sheet so as to cooperate with the adhesive bond to prevent disintegration of the article when used in a water abrading operation, and said coats not deleteriously affecting the flexibility of the article when dry.

16. The process of making a stable waterproof abrasive article in the nature of sandpaper or the like which includes employing a flexible sheet of fabric which has been treated to prevent disintegration when used in a water abrading operation, applying thereto a grit or layer of abrasive particles, and a waterproof stable adhesive bond of a nature to maintain the bonding effect throughout the effective abrading life of the abrasive article when used in a water abrading operation and not deleteriously affecting the flexibility of said sheet when dry.

17. The process of making a stable waterproof abrasive article in the nature of sandpaper or the like which includes employing a flexible sheet of fabric which is treated to prevent disintegration when used in a water abrading operation, applying thereto a grit or layer of abrasive particles, and a waterproof stable adhesive bond and an auxiliary coat, said bond and auxiliary coat cooperating with each other and being of a nature to maintain the bonding effect throughout the effective abrading life of the abrasive article when used in a water abrading operation and not deleteriously affecting the flexibility of said sheet when dry.

18. The process of making a stable waterproof abrasive article in the nature of sandpaper or the like which includes employing a flexible sheet of fabric, one surface of which is treated to prevent disintegration when used in a water abrading operation, applying to the opposite surface thereof a grit or layer of abrasive particles, and a waterproof stable adhesive bond of a nature to maintain the bonding effect throughout the effective abrading life of the abrasive article when used in a water abrading operation and not deleteriously affecting the flexibility of said sheet when dry.

19. The process of making a stable waterproof abrasive article in the nature of sandpaper or the like which includes employing a flexible sheet of fabric one surface of which is waterproof, applying to the opposite surface thereof a grit or layer of abrasive particles, and interposing a waterproof stable adhesive bond and applying an auxiliary coat, said bond and auxiliary coat being of a nature to maintain the bonding effect throughout the effective abrading life of the abrasive article when used in a water abrading operation and not deleteriously affecting the flexibility of said sheet when dry.

20. The process of making a stable waterproof abrasive article in the nature of sandpaper or the like which includes applying to a flexible sheet of fabric a grit or layer of abrasive particles, and a plurality of coats of waterproof material, interposing one of said coats as a primary waterproof stable adhesive bond between said grit and said sheet and of a nature to maintain the bonding effect throughout the effective abrading life of the abrasive article when used in a water abrading operation, applying one of the other coats to the opposite side of the fabric to serve as an auxiliary waterproofing agent and applying the other of said coats over the interposed coat to serve as a secondary bond.

21. The process of making a stable waterproof abrasive article in the nature of sandpaper or the like which includes applying to the flexible sheet of fabric a grit or layer of abrasive particles, and a waterproof bond of a nature to maintain the bonding effect throughout the effective abrading life of the abrasive article when employed in a water abrading operation and not deleteriously affecting the flexibility of said sheet when dry, and applying a waterproof auxiliary coat of analogous character to the article.

22. The process of making a stable waterproof abrasive article in the nature of sandpaper or the like which includes applying to a flexible sheet of fabric a grit or layer of abrasive particles, and interposing a waterproof bond of a nature to maintain the bonding effect throughout the effective abrading life of the abrasive article when employed in a water abrading operation and not deleteriously affecting the flexibility of said sheet when dry, and uniting a waterproof auxiliary bonding coat of analogous character to the article.

23. The process of making a stable waterproof abrasive article in the nature of sandpaper or the like which includes applying to a flexible sheet of fabric a grit or layer of abrasive particles, and interposing a waterproof bond of a nature to maintain the bonding effect throughout the effective abrading life of the abrasive article when employed in a water abrading operation and not deleteriously affecting the flexibility of said sheet when dry, applying a waterproof auxiliary bonding coat of analogous character to the article, and applying heat after one of said steps.

24. The process of making a stable waterproof abrasive article in the nature of sandpaper or the like which includes applying to a flexible sheet of fabric a grit or layer of abrasive particles, and interposing a waterproof bond of a nature to maintain the bonding effect throughout the effective abrading life of the abrasive article when employed in a water abrading operation and not deleteriously affecting the flexibility of said sheet when dry, applying a waterproof auxiliary bonding coat of analogous character to the article, and applying heat after each of said steps.

25. The process of making a stable waterproof abrasive article in the nature of sandpaper or the like which includes applying to a flexible sheet of fabric, a grit or layer of abrasive particles and interposing a waterproof bond of a nature to maintain the bonding effect throughout the effective abrading life of the abrasive article when employed in a water abrading operation and not deleteriously affecting the flexibility of said sheet when dry, which includes allowing the bond to penetrate the sheet, and applying a waterproof auxiliary coat of analogous character to the article.

26. The process of making a stable waterproof abrasive article in the nature of sandpaper or the like which includes applying to a flexible sheet of fabric, a grit or layer of abrasive particles and interposing a waterproof bond of a nature to maintain the bonding effect throughout the effective abrading life of the abrasive article when employed in a water abrading operation and not deleteriously affecting the flexibility of said sheet when dry, which includes allowing the bond to penetrate the sheet, applying a waterproof auxiliary coat of analogous character to the article, and applynig heat after one of said steps.

27. The process of making a stable waterproof abrasive article in the nature of sandpaper or the like which includes applying to a flexible sheet of fabric, a grit or layer of abrasive particles and interposing a waterproof bond of a nature to maintain the bonding effect throughout the effective abrading life of the abrasive article when employed in a water abrading operation and not deleteriously affecting the flexibility of said sheet when dry, which includes allowing the bond to penetrate the sheet, applying a waterproof auxiliary coat of analogous character to the article, and applying heat after each of said steps.

28. The process of making a stable waterproof abrasive article in the nature of sandpaper, which includes employing a flexible sheet of fabric, treating said sheet to prevent disintegration when used in a water abrading operation, applying thereto a grit or layer of abrasive particles, and interposing a waterproof stable adhesive bond of a nature to maintain the bonding effect throughout the effective abrading life of the abrasive article when used in a water abrading operation and not deleteriously affecting the flexibility of said sheet when dry.

29. The process of making a stable waterproof abrasive article in the nature of sandpaper, which includes employing a flexible sheet of fabric, treating one surface of said sheet to prevent disintegration when used in a water abrading operation, applying to the opposite surface thereof a grit or layer of abrasive particles, and interposing a waterproof stable adhesive bond of a nature to maintain the bonding effect throughout the effective abrading life of the abrasive article when used in a water abrading operation and not deleteriously affecting the flexibility of said sheet when dry.

30. An abrasive device comprising a base layer provided with a coating of a moisture-proofing material, said coating having one of its surfaces provided with grit united thereto by a cement which is a partial solvent of said coating, and a sizing coating for said grit carrying cement, one of said coatings having a modifying agent therein.

In testimony whereof, I have hereunto signed my name.

FRANCIS GURNEY OKIE.